(12) United States Patent
Kagami

(10) Patent No.: US 8,907,819 B2
(45) Date of Patent: Dec. 9, 2014

(54) PORTABLE ELECTRONIC DEVICE AND STATE NOTIFICATION METHOD THEREOF

(75) Inventor: Takayuki Kagami, Saitama (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 691 days.

(21) Appl. No.: 13/056,267

(22) PCT Filed: Jul. 15, 2009

(86) PCT No.: PCT/JP2009/063136
§ 371 (c)(1),
(2), (4) Date: Jan. 27, 2011

(87) PCT Pub. No.: WO2010/016385
PCT Pub. Date: Feb. 11, 2010

(65) Prior Publication Data
US 2011/0128166 A1    Jun. 2, 2011

(30) Foreign Application Priority Data

Aug. 6, 2008 (JP) ................................ 2008-202534

(51) Int. Cl.
*H03K 17/94* (2006.01)
*H03M 11/00* (2006.01)
*G06F 3/02* (2006.01)
*G09G 5/00* (2006.01)
*H04M 1/725* (2006.01)
*H04M 19/04* (2006.01)
*G06F 3/023* (2006.01)
*H04M 1/22* (2006.01)

(52) U.S. Cl.
CPC .......... *H04M 1/72519* (2013.01); *H04M 19/04* (2013.01); *H04M 19/048* (2013.01); *G06F 3/0238* (2013.01); *H04M 1/22* (2013.01); *G06F 3/0233* (2013.01)
USPC ................ 341/22; 345/170; 345/168; 341/20

(58) Field of Classification Search
USPC .......... 455/566; 341/22, 23, 27, 28; 345/168, 345/170; 400/487; 348/14.05, 734; 200/5 A–5 EB, 310–314, 317
See application file for complete search history.

(56) References Cited

U.S. PATENT DOCUMENTS 7,120,471 B2 * 10/2006 Deeds ............................ 455/566
2002/0025829 A1 * 2/2002 Kitatani ........................ 455/550
(Continued)

FOREIGN PATENT DOCUMENTS

CN         1961564 A      5/2007
EP         2112869 A      10/2009
(Continued)

OTHER PUBLICATIONS

European search report for EP 09804872.1 dated Jun. 6, 2012.
(Continued)

*Primary Examiner* — Mohammad Ghayour
*Assistant Examiner* — Jerold Murphy
(74) *Attorney, Agent, or Firm* — Sughrue Mion, PLLC

(57) ABSTRACT

A portable electronic device comprises a key input unit including a plurality of keys or buttons. A plurality of key backlight LEDs are arranged right below or close to predetermined keys or buttons of the plurality of keys or buttons. The key backlight LEDs are capable of selecting and setting a plurality of colors for light emission. A light emission control unit provides a notification of a state of the portable electronic device with a lighting pattern of the plurality of key backlight LEDs.

7 Claims, 7 Drawing Sheets

(56) References Cited

U.S. PATENT DOCUMENTS

| | | |
|---|---|---|
| 2002/0183098 A1 | 12/2002 | Lee et al. |
| 2005/0272474 A1 | 12/2005 | Blersch |
| 2008/0167082 A1* | 7/2008 | Gurevich et al. ............. 455/566 |
| 2009/0261739 A1 | 10/2009 | Yang |

FOREIGN PATENT DOCUMENTS

| | | | |
|---|---|---|---|
| JP | 2001257748 A | 9/2001 | |
| JP | 2003008705 A | 1/2003 | |
| JP | 2003309639 A | 10/2003 | |
| JP | 2005134998 A | 5/2005 | |
| JP | 2005136955 A | 5/2005 | |
| JP | 2006295383 A | 10/2006 | |
| JP | 2007081591 A | 3/2007 | |
| JP | 2007150549 A | 6/2007 | |

OTHER PUBLICATIONS

International Search Report for PCT/JP2009/063136 mailed Sep. 29, 2009.

Chinese office action for CN200980131073.1 dated Oct. 9, 2012.

* cited by examiner

PORTABLE ELECTRONIC DEVICE AND STATE NOTIFICATION METHOD THEREOF

TECHNICAL FIELD

The present invention relates to a portable electronic device and a method of notifying a user of a transition of an operating state of a portable electronic device.

BACKGROUND ART

Various portable electronic devices have been provided. One example of those portable electronic devices is a cellular phone. While a variety of functions are provided for a cellular phone, case designs of cellular phones, display images on a display unit, melodies for notification of an incoming call, and the like are diversified according to users' preference. As one of measures to meet those demands for diversification, provision of a backlight function to a key operation unit has been proposed in order to prevent an error of key operation in a cellular phone or to prepare for use in the darkness at night or the like (for example, Patent Document 1).

To put it briefly, this proposal relates to a key backlight control method of a portable electronic device, such as a cellular phone, and intends to enable a plurality of keys of a key operation unit to emit light in different light emission colors with different luminance and light emission patterns so as to improve the efficiency of key identification and key operation when key backlights are turned on.

Patent Document 1: Japanese laid-open patent publication No. 2005-134998

DISCLOSURE OF INVENTION

Problem(s) to be Solved by the Invention

The above proposal principally aims at prevention of an error of user's key operation and assumes that the user should be looking at the keys. In other words, the above proposal is to turn on the key backlights to notify the user of a key that should be looked at for operation by the user. Therefore, if the user turns his/her eyes away from the key, the proposal is almost ineffective.

The present invention aims to provide a portable electronic device having a function of providing a comprehensive notification of a state of the portable electronic device or a transition of the state with a lighting pattern of light-emitting units arranged on a key input unit.

Means to Solve the Problem(s)

According to the present invention, light-emitting units (key backlights) for respectively lighting keys or buttons of a key input unit of a portable electronic device are implemented by light-emitting units capable of emitting light in a plurality of colors (e.g., RGB LEDs). Each of the light-emitting units is independently controlled and turned on. The present invention provides a lighting function for illumination, which may hereinafter be referred to as key illumination lighting. Such a lighting pattern is changed, for example, according to a state transition from a calling state to a connection-established state. Thus, the portable electronic device can notify a user of a state of the portable electronic device even if the user is unaware of display information on a display unit (liquid crystal display unit) of the portable electronic device.

Specifically, a portable electronic device according to a first aspect of the present invention comprises a key input unit including keys or buttons, a plurality of light-emitting units arranged in the key input unit, the plurality of light-emitting units being capable of selecting and setting a plurality of colors for light emission, and light emission control means that controls the plurality of light-emitting units to provide a notification of a state of the portable electronic device with a lighting pattern of the plurality of light-emitting units.

According to a second aspect of the present invention, there is provided a state notification method of a portable electronic device characterized by preparing a portable electronic device comprising a key input unit including keys or buttons, arranging a plurality of light-emitting units in the key input unit, the plurality of light-emitting units being capable of selecting and setting a plurality of colors for light emission, and providing a notification of a state of the portable electronic device with a lighting pattern of the plurality of light-emitting units.

When the key input unit includes a plurality of keys or buttons, the plurality of light-emitting units may be arranged close to predetermined keys or buttons of the plurality of keys or buttons. In this case, a notification can be provided to a user with a large area using the entire key input unit.

Efffect(s) of the Invention

According to a portable electronic device of the present invention, a plurality of light-emitting units are arranged close to keys or buttons of a key input unit so as to enable the keys or buttons to emit light. The portable electronic device can advantageously notify a user of a state of the portable electronic device, e.g., a calling state with a lighting pattern of the plurality of light-emitting units without use of display on a display unit (liquid crystal display unit). Furthermore, since light can be emitted in a plurality of colors, a dynamic expression with light emission can be realized not only by merely changing a color of a key or a button so as to be different from colors of other keys or buttons, but also by sequentially changing lighting periods of colors, lighting positions in the key input unit, and luminance with use of a plurality of light-emitting units in a short period of time. Accordingly, the commercial value of the portable electronic device can advantageously be improved with this light illumination function.

In an example of a cellular phone as a portable electronic device, when a user talks over the cellular phone, it is usually difficult to confirm a display unit (liquid crystal display unit) because the user holds a receiver on his/her ear. According to the present invention, however, a notification is provided with a lighting pattern, which can visually be confirmed. Therefore, the fact that the cellular phone has changed to a connection-established state can be confirmed not only in an auditory manner, but also in a visual manner.

MODE(S) FOR CARRYING OUT THE INVENTION

[Configuration of Embodiment]

Figure 1:
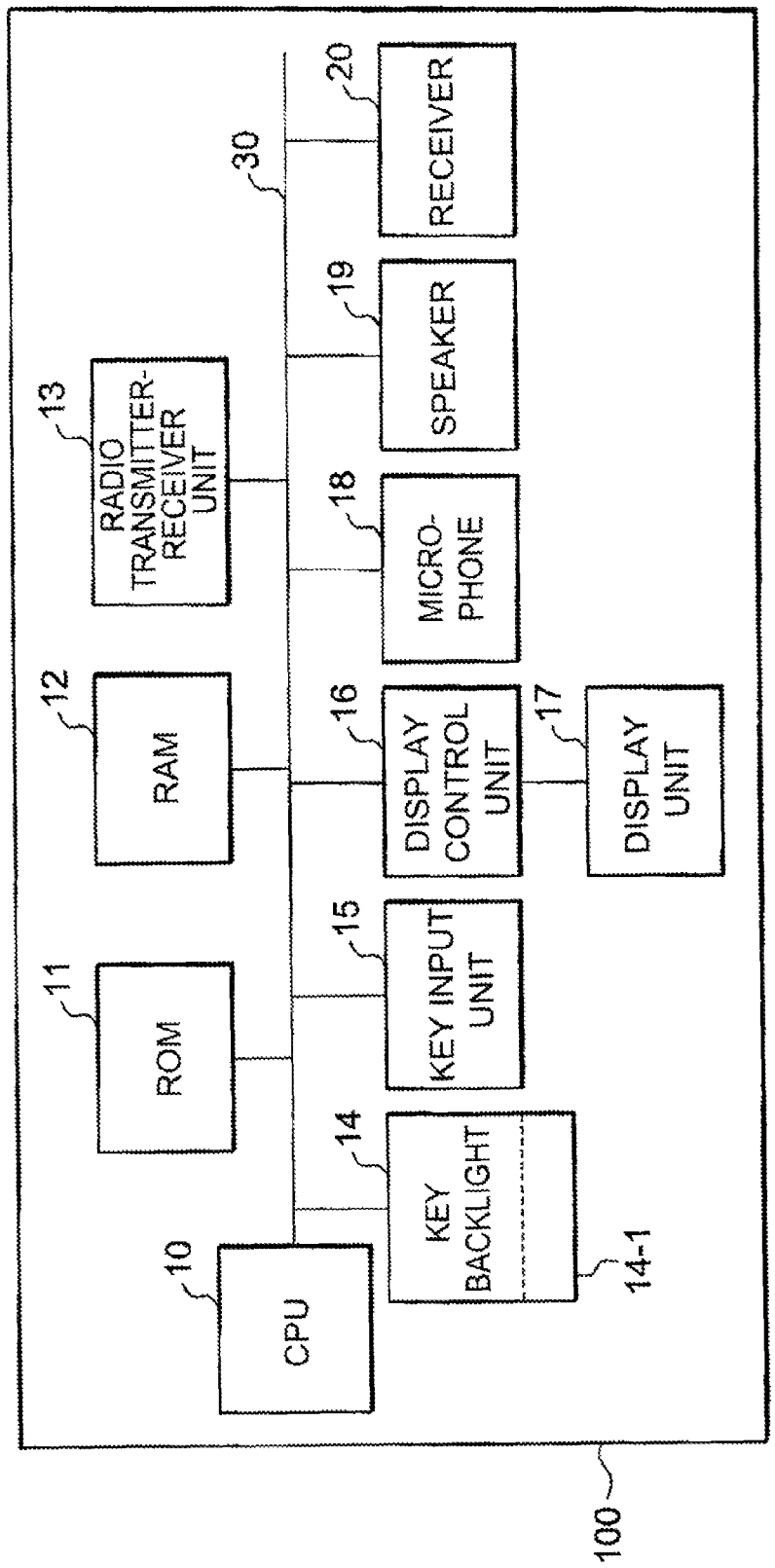
FIG. 1 shows a circuit configuration of an embodiment in which the present invention is applied to a cellular phone.

FIG. 1 shows a circuit configuration of an embodiment in which the present invention is applied to a cellular phone.

Referring to FIG. 1, a cellular phone 100 according to the present embodiment comprises a CPU (central processing unit) 10 mounted thereon. The CPU 10 is connected to each component of the cellular phone 100 via a bus 30.

A ROM (Read Only Memory) 11 of the components of the cellular phone 100 is a memory for storing various kinds of control programs for the CPU 10 to execute, such as a key backlight control, which will be described later, fixed melody data for notification to a user, and the like. Meanwhile, a RAM (Random Access Memory) 12 is a memory for storing data inputted by a user and data downloaded via communication.

A key backlight 14 is formed by a plurality of key backlight LEDs (light-emitting units) for lighting a key input unit 15 and an RGB control unit (light emission control means) 14-1. The RGB control unit 14-1 controls three light-emitting elements of Red, Green, and Blue (RGB), so that light can be emitted in a plurality of colors. Specifically, the key backlight LEDs include a plurality of sets of LEDs, each set including three light-emitting elements of RGB. Each of the LEDs can also be controlled individually. Therefore, the key backlight 14 can turn on all of the LEDs in the same color or turn on some of LEDs individually in desired colors.

The key input unit 15 includes an input circuit operable to receive an input from various kinds of keys (such as a ten-key pad, function keys, and keys located outside when the cellular phone is folded up).

A display control unit 16 includes a control circuit operable to control display of a display unit 17 such as a liquid crystal display.

A microphone 18, a speaker 19, and a receiver 20 are acoustic parts used for a telephone conversation via the cellular phone. A voice of a sender (user) is inputted with the microphone 18, and a voice of the other talker is outputted from the speaker 19 or the receiver 20.

A radio transmitter-receiver unit 13 is a circuit operable to transmit and receive data by radio. Transition information of a calling state and a connection-established state is determined by data transmission between the radio transmitter-receiver unit 13 and the CPU 10.

A packaging example of the key backlight LEDs will be described with reference to FIGS. 2A to 2C.

Figure 2:
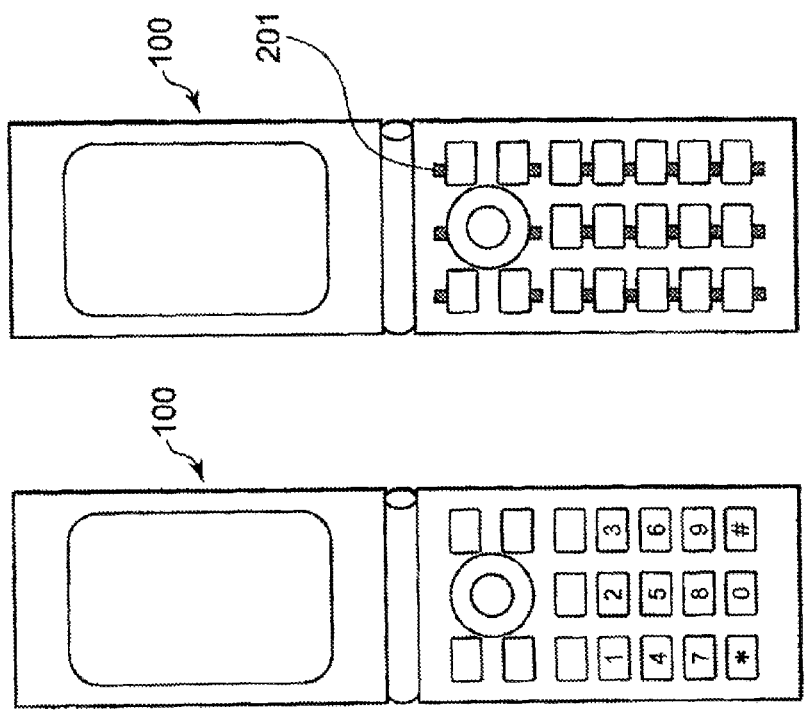
FIGS. 2A to 2C are diagrams explanatory of a packaging example of key backlight LEDs on a key input unit in the cellular phone of FIG. 1.

In FIGS. 2B and 2C, the key backlight LEDs 201 are formed by RGB components. Specifically, each of the key backlight LEDs 201 is implemented by three light-emitting elements (e.g., LEDs) R, G, and B. The key backlight LEDs 201 are connected to a power source and the RGB control unit of the key backlight 14.

The RGB control unit can control the luminance, the lighting period of the light-emitting elements R, G, and B, and the like and allows a user to select and set a lighting color. Data on selection and setting of the lighting color by a user are stored in the RAM 12.

The key backlight LEDs 201 are located right below or close to every key (button) or any desired keys (buttons) of the cellular phone 100. FIG. 2B shows a packaging example of the key backlight LEDs 201 arranged in 3 columns and 7 rows.

[Operation of Embodiment]

An operation of the embodiment will be described with reference to FIGS. 3 to 6.

Figure 3:
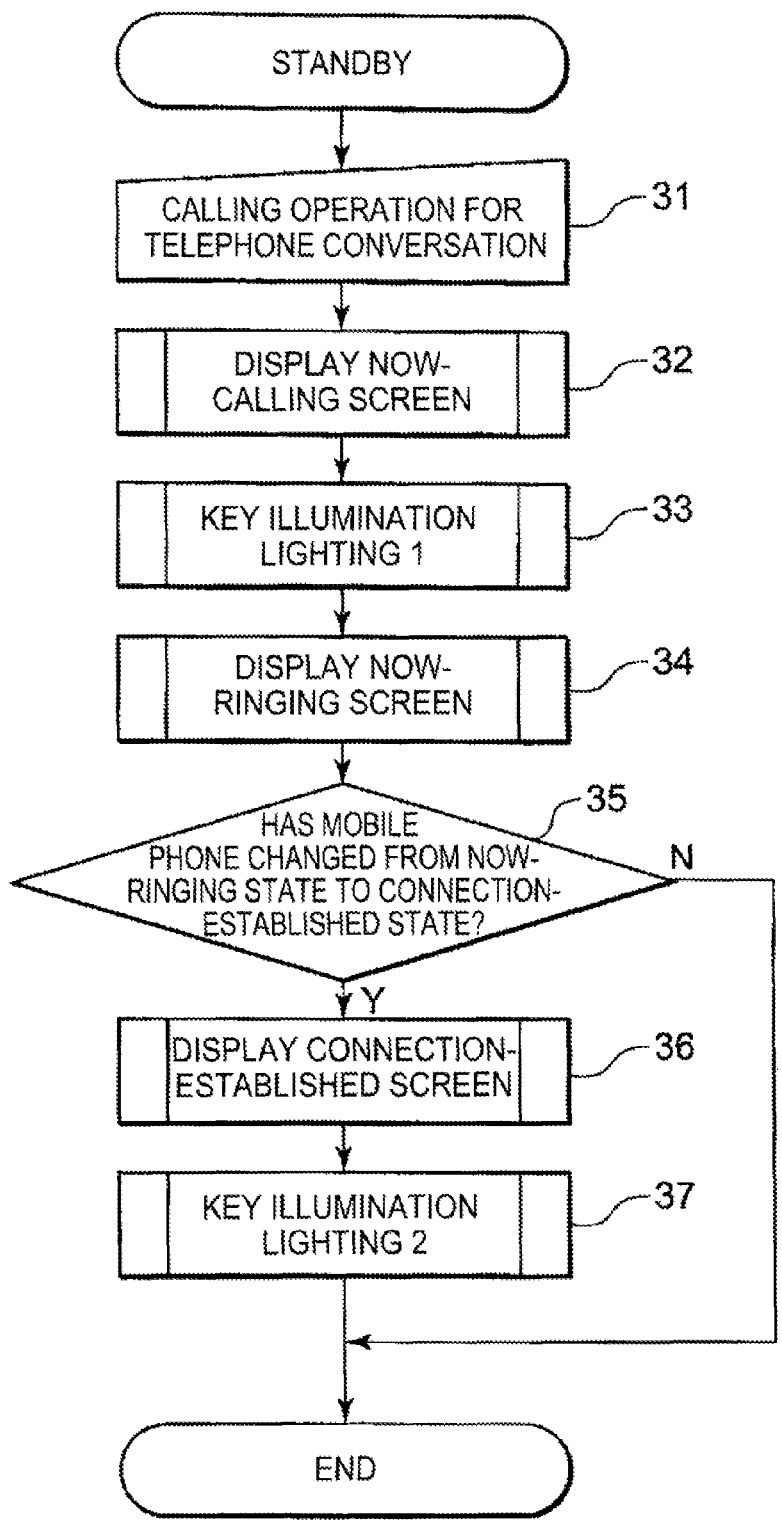
FIG. 3 is a flow chart explanatory of lighting timing of the key backlight LEDs and display timing of a display unit in the cellular phone of FIG. 1.

First, lighting timing of the key backlight LEDs and display timing of the display unit 17 will be described with reference to FIG. 3. FIG. 3 is a flow chart showing a control operation of the RGB control unit 14-1 in the key backlight 14 and a control operation of the display control unit 16.

A user manually operates the key input unit 15 so as to take a calling action for a telephone conversation with use of telephone number information stored in the RAM 12 or the like (Step 31). When this calling action has been taken, a now-calling screen is displayed on the display unit 17 by the display control unit 16 (Step 32). At that time, the RGB control unit 14-1 of the key backlight 14 turns on the key backlight LEDs with a lighting pattern of key illumination lighting 1, which will be described later, and notifies the user that the cellular phone 100 is making a call (Step 33).

Thereafter, the cellular phone changes from the now-calling state into a now-ringing state. According to the state of the cellular phone, the display of the display unit 17 also changes from the now-calling screen (Step 32) into a now-ringing screen (Step 34). The RGB control unit 14-1 of the key backlight 14 continues the lighting pattern of the key illumination lighting 1 (Step 33) on the key backlight LEDs.

Then the CPU 10 determines whether the cellular phone has changed from the ringing state to a connection-established state (Step 35). If the cellular phone has changed to the connection-established state, the display of the display unit 17 is changed into a connection-established screen (Step 36). Meanwhile, the RGB control unit 14-1 of the key backlight 14 turns on the key backlight LEDs with a lighting pattern of key illumination lighting 2, which will be described later, instead of the lighting pattern of the key illumination lighting 1 (Step 37). If the cellular phone does not change into the connection-established state in Step 35 because the called phone does not respond to the call, the lighting pattern of the key illumination lighting 1 (Step 33) is continued until the now-ringing state is interrupted.

Figure 4:
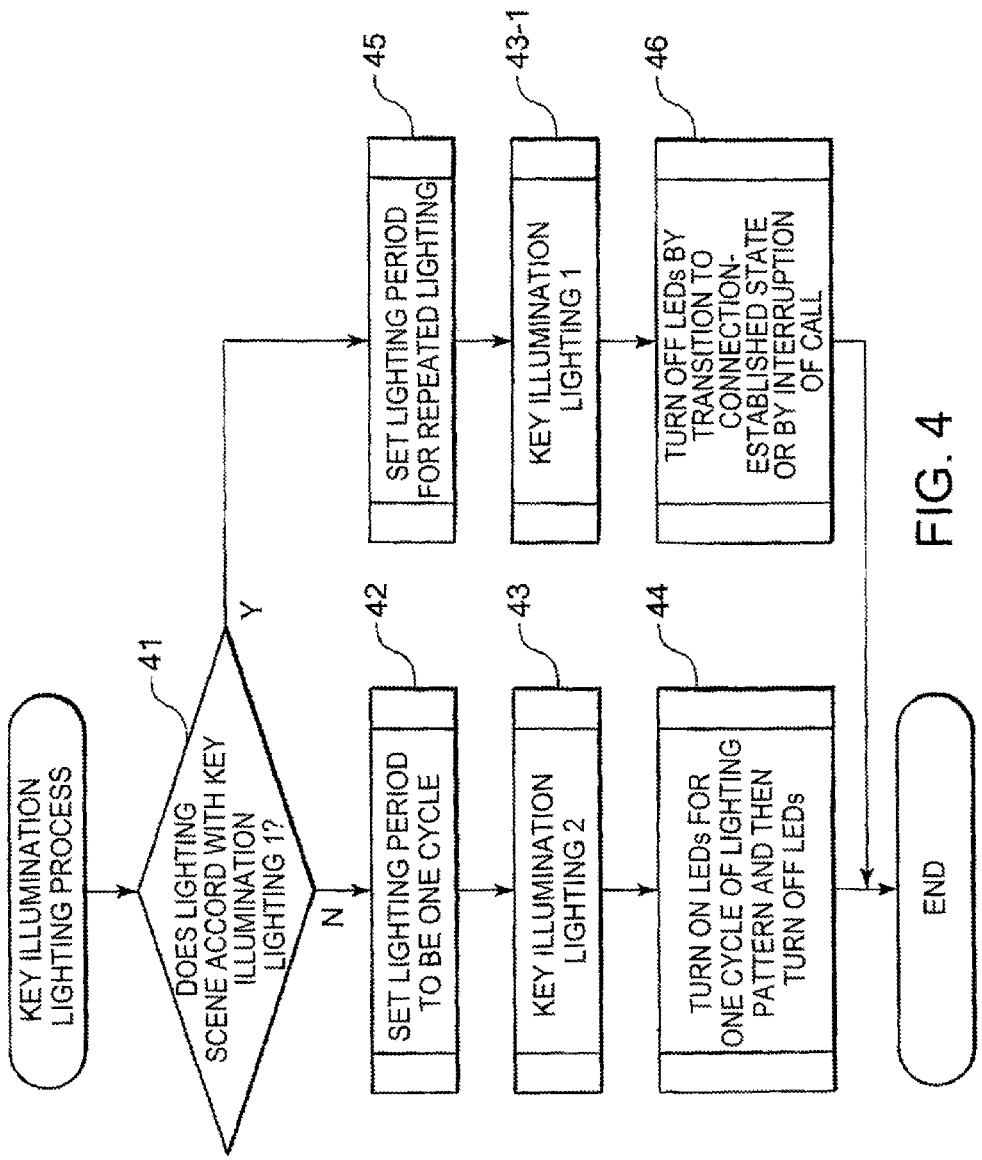
FIG. 4 is a flow chart explanatory of a control method of key illumination lighting in a RGB control unit of the cellular phone of FIG. 1.

Next, a control method of key illumination lighting by the RGB control unit 14-1 (key illumination lighting process) will be described with reference to FIG. 4.

Since lighting patterns have different lighting periods, the RGB control unit 14-1 does not control the key illumination lighting by time, but by cycles of those patterns. First, the RGB control unit 14-1 determines whether the lighting scene accords with the key illumination lighting 1 of Step 33 (FIG. 3) (Step 41). If the lighting scene does not accord with the key illumination lighting 1 of Step 33, the lighting period of key illumination is set to be one cycle (Step 42). The RGB control unit 14-1 performs the key illumination lighting 2 (Step 43) so as to turn on the key backlight LEDs for data of one cycle and then to turn off the key backlight LEDs (Step 44).

Meanwhile, if the RGB control unit 14-1 determines in Step 41 that the lighting scene accords with the key illumination lighting 1 of Step 33 (FIG. 3), then it sets the lighting period for repeated lighting (Step 45) and performs the key illumination lighting 1 (Step 43-1). When the cellular phone changes into a connection-established state, or when the call is interrupted without transition into a connection-established state, the key illumination lighting 1 is turned off (Step 46).

Figure 5:
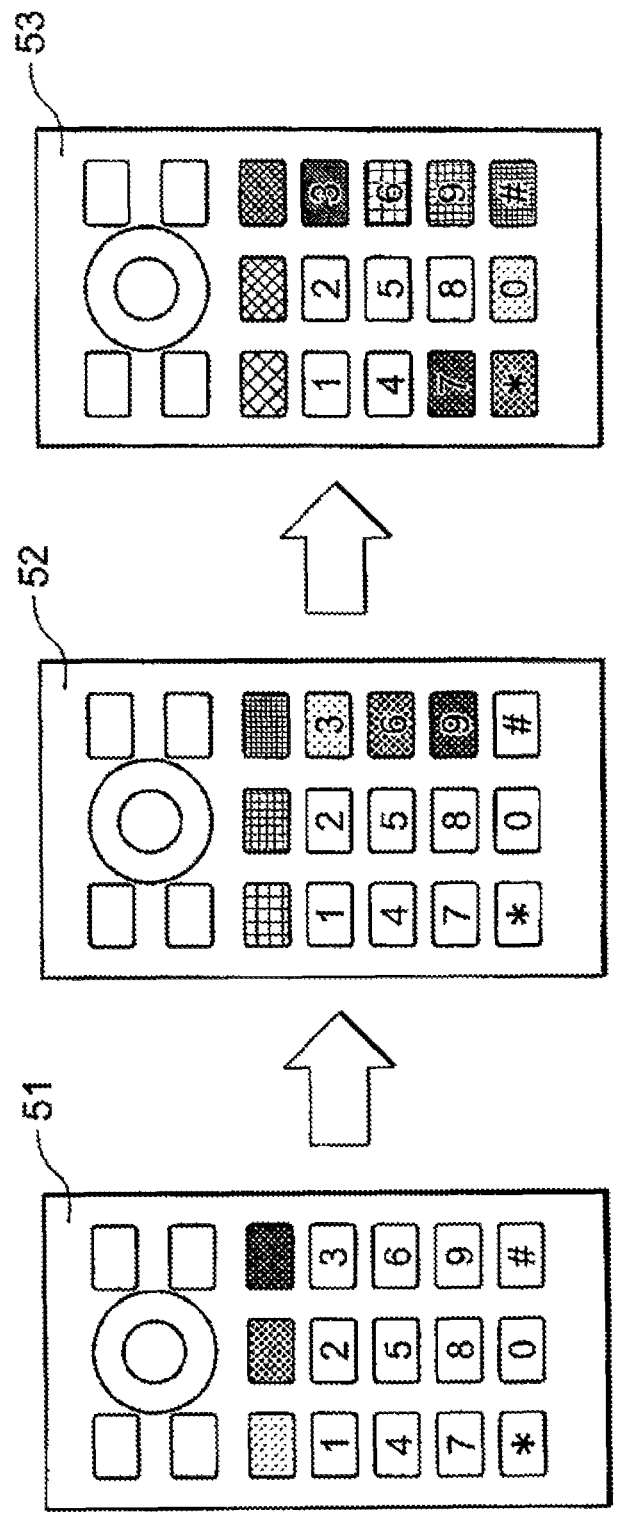
FIG. 5 is a diagram explanatory of an example of a lighting pattern for a lighting scene of key illumination lighting 1 shown in FIG. 4.

FIG. 5 shows an example of the lighting pattern for the lighting scene of the key illumination lighting 1. This example shows the following pattern: Among the key backlight LEDs in 3 columns and 7 rows, 12 outer key backlight LEDs in 3 columns and 5 rows, which exclude the upper LEDs of 3 columns and 2 rows, are sequentially turned on from the upper left (51 of FIG. 5). The key backlight LEDs are turned on so as to circle along the circumference (12 keys) of the key input unit (52 and 53 of FIG. 5). In the drawings, white keys without a shade represent keys not being lighted, whereas shaded keys represent keys being lighted by the key backlight LEDs. Different levels of shading represent different lighting colors. As is apparent from 51 and 52 of FIG. 5, the lighting color is changed in some keys. Thus, the lighting pattern has different lighting colors with individual keys. Therefore, the state transition of the cellular phone can readily appeal to vision. Such a lighting pattern does not intend a user to look at each key individually. Accordingly, even if the user turns his/her eyes away from the key input unit for a moment, the user can readily recognize the lighting pattern and know the state of the cellular phone (the now-calling state or the now-ringing state) as long as the key input unit is within the user's view.

Figure 6:
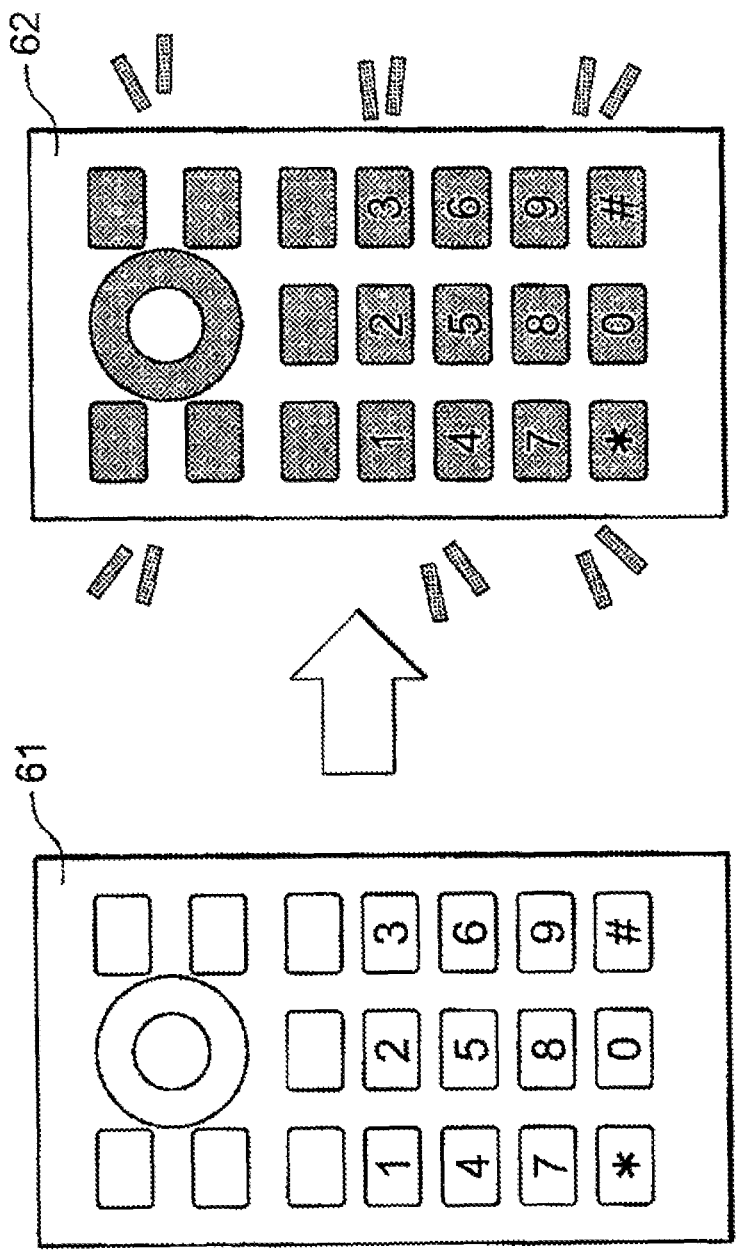
FIG. 6 is a diagram explanatory of an example of a lighting pattern for a lighting scene of key illumination lighting 2 shown in FIG. 4.

Meanwhile, FIG. 6 shows an example of the lighting pattern for the lighting scene of the key illumination lighting 2. In FIG. 6, white keys on the left side represent keys not being lighted, whereas darken keys on the right side represent keys lighted by the key backlight LEDs. This example shows a pattern in which all of the key backlight LEDs are brightened momentarily (62) when the cellular phone changes from the now-ringing state (61) into the connection-established state. Such a lighting pattern does not intend a user to look at each key individually. Even if each of the keys is out of the user's view when the user holds the cellular phone on his/her face, the user can readily recognize the lighting pattern and know the state of the cellular phone (the connection-established state) as long as part of the key input unit is within the user's view.

Figure 7:
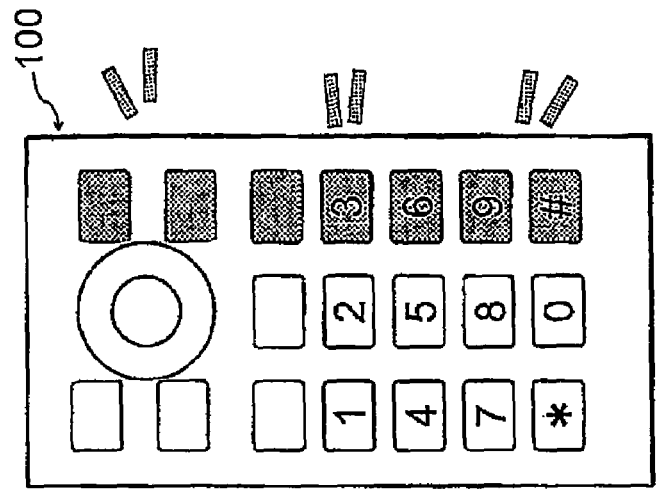
FIG. 7 is a diagram explanatory of an example of a lighting pattern for a user who is right-handed.
Figure 8:
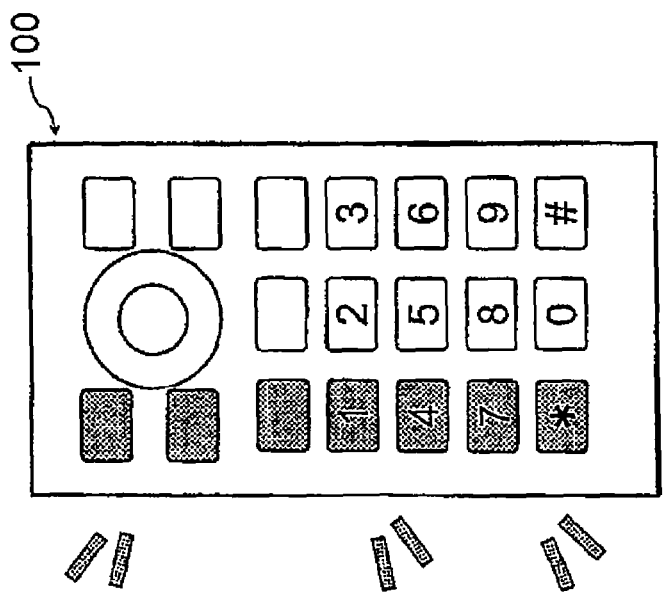
FIG. 8 is a diagram explanatory of an example of a lighting pattern for a user who is left-handed.

Instead of the aforementioned lighting patterns, for example, only the rightmost seven keys or only the leftmost seven keys of the plurality of keys as shown in FIG. 5 may be selected and set to be lightened. In this case, if the user is right-handed, only the leftmost seven keys are set to be lightened, as shown in FIG. 7. If the user is left-handed, only the rightmost seven keys are set to be lightened, as shown in FIG. 8. With such configuration, an advantageous effect can be provided in which everybody can readily recognize the state of the cellular phone irrespective of the user's handedness.

The lighting data of the aforementioned scenes can be selected and set from a plurality of sets of lighting data stored in the RAM 12, regardless of preinstalled data, data downloaded via communication, and data set by the user.

As is apparent from the above discussion, with the key backlight operable to enable the key input unit to emit light in a plurality of colors, the cellular phone according to the embodiment can advantageously notify a user of a transition of an operating state without the liquid crystal display of the display unit. Furthermore, since light can be emitted in a plurality of colors, a dynamic expression with light emission can be realized not only by merely changing a color of a key so as to be different from colors of other keys, but also by sequentially changing a lighting pattern, i.e., lighting periods of colors, lighting positions, luminance, and the like, with use of a plurality of key backlight LEDs in a short period of time. Accordingly, the commercial value of the cellular phone can advantageously be improved with this light illumination function.

When a user talks over the cellular phone, it is usually difficult to confirm a display unit because the user holds a receiver on his/her ear. According to the present embodiment, however, a notification of transition information of the cellular phone is provided by the key backlight, which can visually be confirmed. Therefore, the fact that the cellular phone has changed from a now-ringing state to a connection-established state can be confirmed not only in an auditory manner, but also in a visual manner.

[Other Embodiments]

In the above embodiment, a notification of a state transition of the cellular phone is limited to the transition from a now-calling state via a now-ringing state to a connection-established state. With regard to other notifications of a state transition of the cellular phone, a user notification can be provided by a similar control operation in various scenes including a transition of a remaining amount of an internal memory, a capacity status of an internal battery (for example, a transition from a fully-charged state into an empty state is displayed with a lighting pattern of separate colors), and a receiving sensitivity state (for example, the entire key input unit is lightened in a bright color, e.g., a light blue, at a state of high receiving sensitivity, and the color is changed close to a red for drawing user's attention as the receiving sensitivity is deteriorated).

Furthermore, colors of the lighting patterns may be varied in association with the time. For example, some keys may be lightened in red for the first five seconds of a period after a calling operation of the cellular phone before a receiver's answer. The same keys may be lightened in blue for the subsequent six to ten seconds. The same keys may be lightened in green for the subsequent eleven to fifteen seconds. In this manner, the cellular phone may be configured to visually notify the user of the time.

The present invention is applicable not only to a cellular phone, but also to a general portable electronic device having a key input unit.

Other embodiments of the present invention include a control program for the aforementioned key backlight control that is read from a ROM by a CPU and a recording medium that has stored such a control program. The program is for a control unit, included in a portable electronic device having a key input unit including keys or buttons and a plurality of light-emitting units arranged in the key input unit so that the plurality of light-emitting units can select and set a plurality of colors for light emission, to perform a control for changing a lighting pattern of the plurality of light-emitting units. The program is for performing a first step of turning on the plurality of light-emitting units with a first lighting pattern when a calling operation is performed and a second step of turning on the plurality of light-emitting units with a second lighting pattern when the state changes into a ringing state and a connection-established state after the calling operation.

The present invention has been described with reference to several embodiments. However, the present invention is not limited to the above embodiments. It is apparent to those skilled in the art that various modifications can be made in the configuration and details of the present invention within the spirit and scope of the present invention as recited in the claims.

This application is the National Phase of PCT/JP2009/063136, filed Jul. 15, 2009, which claims the benefit of priority from Japanese patent application No. 2008-202534, filed on Aug. 6, 2008, the disclosure of which is incorporated herein in its entirety by reference.

The invention claimed is:

1. A portable electronic device comprising a key input unit including a plurality of keys or buttons, characterized by further comprising:

a plurality of light-emitting units arranged in each of the plurality of keys or buttons in the key input unit, the plurality of light-emitting units each having a plurality of light emission colors; and light emission control means that controls the plurality of light-emitting units to provide a notification of a state of the portable electronic device with a lighting pattern and the light emission colors of the plurality of light-emitting units, wherein:

the light emission control means changes the lighting pattern to a first key illumination lighting when a calling action is taken or to a second key illumination when the state of the portable electronic device is changed to a connection-established state and changes the lighting pattern in association with at least the light emission color and a lighting period to thereby perform the first key illumination lighting in which the lighting period is set to repeated lighting and the second key illumination lighting in which the lighting period is set to one cycle, and wherein the light emission control means changes the lighting pattern so that only rightmost plurality of keys or buttons are set to be lightened in a case where a user is right-handed or that only leftmost plurality of keys or buttons are set to be lightened in a case where a user is left-handed.

2. The portable electronic device as recited in claim 1, characterized in that the plurality of light-emitting units are arranged right below or close to predetermined keys or buttons of the plurality of keys or buttons in the key input unit.

3. The portable electronic device as recited in claim 1, characterized in that the light emission control means changes the lighting pattern to notify a user of a transition of the state, including a transition from a calling operation of the portable electronic device to a calling and ringing state, a transition from the calling and ringing state to a connection-established state, a state transition of a battery capacity, and a transition of a receiving sensitivity state.

4. The portable electronic device as recited in claim 1, characterized by comprising a memory operable to store the lighting pattern of the plurality of light-emitting units, the lighting pattern being registered by at least one of preinstallation, downloading via communication, and setting operation by a user.

5. A state notification method of a portable electronic device, comprising:

preparing a portable electronic device comprising a key input unit including a plurality of keys or buttons;

arranging a plurality of light-emitting units in each of the plurality of keys or buttons in the key input unit, the plurality of light-emitting units each having a plurality of light emission colors; and providing a notification of a state of the portable electronic device with a lighting pattern of the plurality of light-emitting units, wherein the method further comprises:

changing the lighting pattern to a first key illumination lighting when the state of the portable electronic device is changed to a connection-established state and changing the lighting pattern in association with at least the light emission color and a lighting period to thereby perform the first key illumination lighting in which the lighting period is set to repeated lighting and the second key illumination lighting in which the lighting period is set to one cycle, and changing the lighting pattern so that only rightmost plurality of keys or buttons are set to be lightened in a case where a user is right-handed or that only leftmost plurality of keys or buttons are set to be lightened in a case where a user is left-handed.

6. The state notification method of a portable electronic device as recited in claim 5, characterized in that the plurality of light-emitting units are arranged right below or close to predetermined keys or buttons of the plurality of keys or buttons in the key input unit.

7. The state notification method of a portable electronic device as recited in claim 5, characterized by changing the lighting pattern to notify a user of a transition of the state, including a transition from a calling operation of the portable electronic device to a calling and ringing state, a transition from the calling and ringing state to a connection-established state, a transition of a remaining amount of an internal memory, a state transition of an internal battery capacity, and a transition of a receiving sensitivity state.

* * * * *